(12) United States Patent
Lin et al.

(10) Patent No.: US 9,641,781 B2
(45) Date of Patent: May 2, 2017

(54) IMAGING CIRCUIT INCLUDING FRAME ASYNCHRONOUS PULSE DETECTION

(71) Applicant: Hamilton Sundstrand Corporation, Charlotte, NC (US)

(72) Inventors: Minlong Lin, Plainsboro, NJ (US); Joshua Lund, Dallas, TX (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 10 days.

(21) Appl. No.: 14/672,336

(22) Filed: Mar. 30, 2015

(65) Prior Publication Data

US 2016/0295148 A1    Oct. 6, 2016

(51) Int. Cl.
H04N 5/376      (2011.01)
H04N 5/3745     (2011.01)
H04N 5/335      (2011.01)

(52) U.S. Cl.
CPC ......... *H04N 5/3765* (2013.01); *H04N 5/335* (2013.01); *H04N 5/3745* (2013.01)

(58) Field of Classification Search
CPC .................... H04N 5/3745; H04N 5/3765
See application file for complete search history.

(56) References Cited

U.S. PATENT DOCUMENTS

| 4,862,257 A | 8/1989 | Ulich |
| 5,313,502 A | 5/1994 | Nawrocki et al. |
| 8,755,564 B1 | 6/2014 | Kukshya et al. |
| 2003/0015647 A1* | 1/2003 | Guo ........................ H04N 3/155 250/208.1 |
| 2012/0261553 A1 | 10/2012 | Elkind et al. |
| 2016/0057366 A1 | 2/2016 | Lee et al. |

FOREIGN PATENT DOCUMENTS

EP      2512125       10/2012

OTHER PUBLICATIONS

U.S. Appl. No. 14/672,295, filed Mar. 30, 2015.

* cited by examiner

*Primary Examiner* — Ahmed A Berhan
(74) *Attorney, Agent, or Firm* — Carlson, Gaskey & Olds, P.C.

(57) ABSTRACT

A pulse detecting imaging circuit includes a pixel array including multiple pixels arranged in at least one row and at least one column. The pixel array includes multiple row voltages and column voltages. Each of the row voltages is connected to each pixel in the corresponding row and each of the column voltages is connected to each pixel in the corresponding column. Each of said pixels includes an imaging circuit and a pulse detection circuit. An output of each pulse detection circuit is connected to a corresponding row voltage and a corresponding column voltage such that each pixel is configured to connect the corresponding row voltage and the corresponding column voltage to a ground or a known driven voltage in response to a pulse detection at the pixel.

12 Claims, 2 Drawing Sheets

IMAGING CIRCUIT INCLUDING FRAME ASYNCHRONOUS PULSE DETECTION

TECHNICAL FIELD

The present disclosure relates generally to pulse detection circuits for detecting a pulse in an image sensor, and specifically to a frame asynchronous method of detecting pulses in an image sensor.

BACKGROUND

Many imaging applications require systems to be able to detect stimulus pulses and recognize their pulse frequency. A pulse as a short duration stimulus with significantly higher signal strength than the image background. Some exemplary applications of pulse detection and pulse repetition frequency (PRF) decoding are laser range finding, laser see spot, and target designation and differentiation. Pulse detection capabilities can also be useful in a variety of commercial and industrial imaging systems.

The exemplary applications require an image sensor that can accurately isolate timing and image location of a pulse, when the pulse has a short duration. Typically, a timing accuracy of less than 50 microseconds is desired, although some applications can require a shorter detection time period. In each of the exemplary applications, a controller analyzes each pixel in a pixel array for pulse data after the full pixel array has provided imaging data to the controller. The process of providing data to the controller from a pixel is referred to as the pixel reading out to the controller. Analyzing an entire frame (full array) of pixels for pulse detection each time the array reads out introduces a pulse detection delay, limits a pulse detection speed to the frame rate of the pixel array, and increases the processing power required for the controller to perform the analysis.

SUMMARY OF THE INVENTION

Disclosed is a pulse detecting imaging circuit comprising: a pixel array including a plurality of pixels arranged in at least one row and at least one column, a plurality of row voltages, each of the row voltages being connected to each pixel in a corresponding row, a plurality of column voltages, each of the column voltages being connected to each pixel in a corresponding column, each of the pixels including an imaging circuit and a pulse detection circuit, and an output of each pulse detection circuit connected to a corresponding row voltage and a corresponding column voltage such that each pixel is configured to assert a voltage change on the corresponding row voltage and the corresponding column voltage in response to a pulse detection at the pixel.

Also disclosed is a method for asynchronous pulse detection in a digital imaging circuit comprising detecting a pulse in at least one pixel of a digital imaging pixel array, switching a connection between at least one voltage source corresponding to the at least one pixel and a digital logic block, determining a specific pixel address of the at least one pixel detecting the pulse based on an alteration of at least one received voltage at the digital logic block, and outputting the specific pixel address to a controller.

These and other features of the present invention can be best understood from the following specification and drawings, the following of which is a brief description.

DETAILED DESCRIPTION OF AN EMBODIMENT

Most existing pulse detecting digital imaging systems detect the presence of a pulse at a given pixel in a pixel array as a separate process distinct from the digital imaging process. In order to detect pulses, a pulse detection process is performed on each pixel in the array after the full pixel array has been reported out. Pulse detection information is provided from each pixel to the controller independent of whether a pulse occurred at the pixel and the controller analyzes the pulse detection information to determine if a pulse occurred. Each iteration, the controller analyzes every pixel in the pixel array and determines which pixels detected a pulse, and any required corresponding information related to the pulse.

Figure 1:
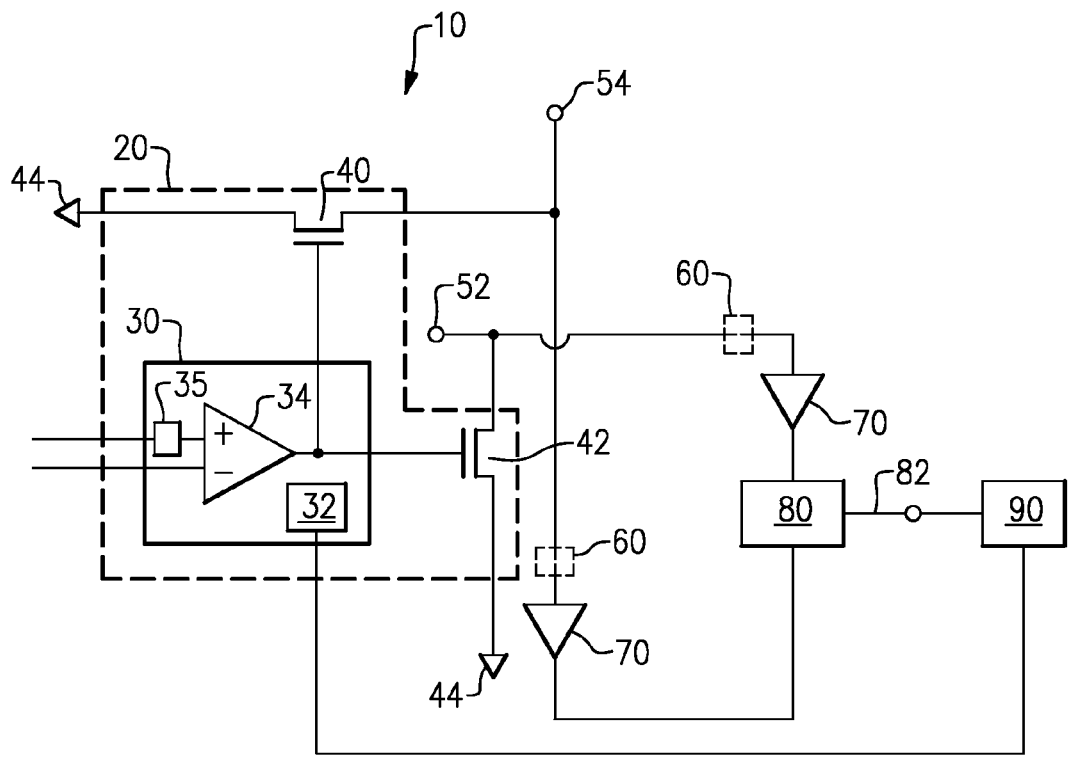
FIG. 1 schematically illustrates an exemplary pulse detection circuit according to one embodiment.
Figure 3:
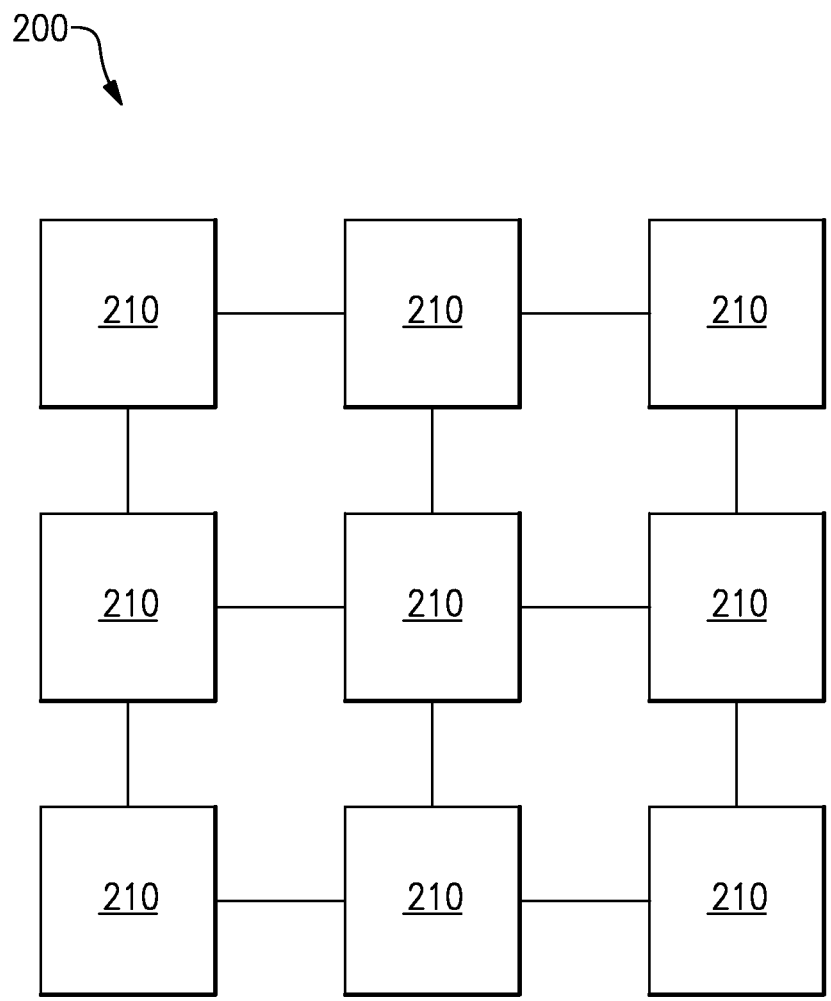
FIG. 3 schematically illustrates a pixel array for an imaging device.

FIG. 1 illustrates an exemplary pulse detection circuit 10, including a single pixel 20. FIG. 3, illustrates a high level arrangement of pixels 210 in a series of rows and columns to create a pixel array 200. While the pixel array 200 of FIG. 3 includes nine pixels 210 illustrated as a three-by-three array, it is understood that a practical implementation can have significantly more pixels in each column and row. The pulse detection circuit 10 in each pixel 20 allows a controller 90 to receive pulse detection data from only the pixels 20 in which a pulse occurred and allows the controller 90 to asynchronously analyze the pulse data independent of the readout frame rate of the pixel array 200. The independent analysis is referred to as being asynchronous with the imaging.

Within each pixel 20 is a pixel circuit 30 including an imaging circuit 32, a pulse detection comparator 34 and a pulse detection circuit 35. The imaging circuit 32 can be any standard digital imaging circuit, and is connected to the controller 90 using any standard connection and communication arrangement. The pulse detection comparator 34 is connected to the pulse detection circuit 35 and outputs a high value whenever a pulse is detected at the pixel 20 and a low value when no pulse is detected at the pixel 20. The pulse detection circuit 35 can be any pulse detection circuit capable of operating contemporaneously with the imaging circuit 32.

The output of the comparator 34 is connected to a control input of two transistors 40, 42. In a practical implementation, the transistors 40, 42 can be either PMOS or NMOS transistors. Each of the transistors 40, 42 connects a corresponding pull up voltage source 52, 54 to a ground 44 when controlled in a closed state. In alternative examples, the ground 44 can be replaced with any driven voltage, where the voltage level of the driven voltage is known. When the transistors 40, 42 are in an open state, each of the pull up voltages 52, 54 is connected to a pulse detection digital logic block 80 through a sense amplifier circuit 70. In some examples optional analog processing elements 60, such as capacitive filters, can be included between the pull up voltage sources 52, 54 and the pulse detection digital logic block 80.

While illustrated as connected to a single pixel 20, in a practical implementation a single pulse detection digital logic block 80 can be connected to multiple, or all of the pixels 20 within a single pixel array 200. Further, in a practical implementation each voltage source 52, 54 corresponds to a single row or column, and provides a voltage level unique to that row or column.

During operation, when a pulse is detected by the pulse detection circuit 35, the comparator 34 switches on and drives the row transistor 42 and the column transistor 40 to switch on. When each of the transistors 40, 42 switches on, the corresponding voltage 52, 54 experiences a voltage change, which can be sensed by the sense amplifier circuit 70 and passed to the pulse detection digital logic block 80. When any change in row and column voltages 52, 54 is detected at the pulse detection logic block 80, the pulse detection logic block 80 will store a digital level representative of each column and row voltage for all columns and rows in the array. For the case where only one pixel has detected a pulse, this information may be encoded directly as a pixel address. The row and column identification of each pixel 20 is referred to as a pixel address, and uniquely identifies a specific pixel 20, or grouping of pixels 20, within the pixel array.

In an alternate example, where a pulse has been detected in several contiguous pixels contained in a bounding box, this information may be encoded as two pixel addresses that define opposite corners of the bounding box. For a third case where discrete pulses are detected at discrete locations in the array, the digital representation of the row and column voltages may be output directly, or more complex encoding logic may be employed to summarize bounding box pixel addresses of the multiple locations. In each of these cases, the output row and column information is referred to as the pixel address summary information.

The pulse detection digital logic block 80 further includes time stamping logic that generates a timestamp when a pulse is detected at a pixel 20. The timestamp is encoded along with the corresponding pixel address on a pulse detected signal. The pulse detected signal is output from the pulse detection digital logic block 80 to a controller 90 along an output 82. In some examples, the controller 90 receives outputs from each pulse detection digital logic block 80 in the pixel array 200, and from each of the imaging circuits 32 in the pixel array 200.

The output of the digital logic block 80 in some examples includes a binary summary of all columns and row voltages at a time a pulse is detected encoded onto the output. In alternative examples, the output of the digital logic block 80 can include a summary of multiple pixel addresses encoded onto the output. In yet further examples, the output can include both the summary of all column and row voltages and the multiple pixel addresses.

The controller 90 can then process the imaging data and the pulse data contemporaneously and asynchronously. As each pixel 20 detecting a pulse outputs the pixel address and the timestamp of the detected pulse, the controller 90 only processes the data of the identified pixels for pulses, and the controller 90 need not process the data of all the pixels 20. Further, the controller 90 can analyze each detected pulse asynchronously with the data imaging. In other words, the detected pulses can be analyzed independent of the readout frame rate of the pixel array 200.

By identifying the specific pixel 20 including a pulse detection, pulse detections can be resolved as they occur, and the controller 90 need not wait for a full readout (output) of the pixel array 200. This further allows for the pixel array to include a larger number of pixels 210, relative to existing pixel arrays, while requiring only a minimal processing power increase. Further, as the timestamp is applied immediately upon detection of the pulse, and the detected pulse and timestamp are output from the pulse detection digital logic block 80 to the controller 90, no in-built storage elements for storing pulse data are required in each of the pixels 20.

Figure 2:
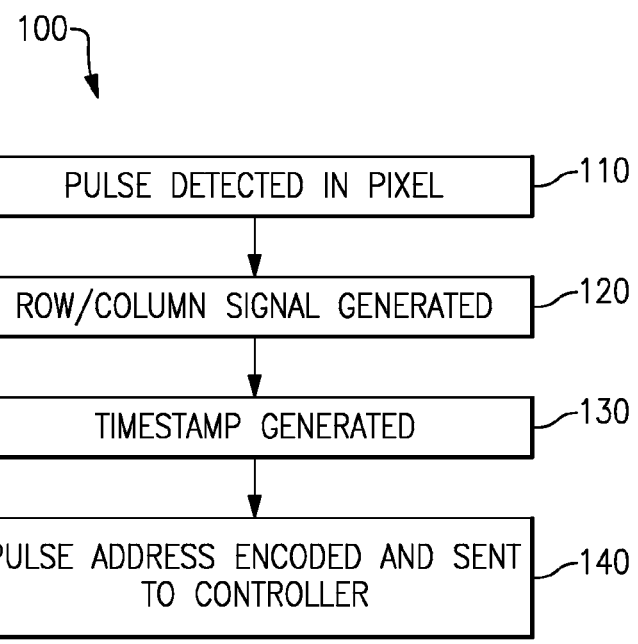
FIG. 2 illustrates a flowchart demonstrating a method of asynchronous pulse detection in an imaging circuit.

With continued reference to FIGS. 1 and 3, FIG. 2 illustrates a flow chart demonstrating the pulse detection process within a single pixel 20. Initially a pulse is detected using the pulse detection circuit 35 and the comparator 34 at a "Pulse Detected in Pixel" block 110. Once the pulse is detected, a row/column signal identifying the pixel address of the pixel detecting a pulse is generated using the pull up row and column voltage sources 52, 54 described above. The pulse detection digital logic converts the row/column pull up voltages into a corresponding coordinate grid address, referred to as the pixel address, at a "Row/Column Signal Generated" block 120.

Once the coordinate grid address has been determined, the pulse detection digital logic block 80 generates a timestamp corresponding to the time in which the pulse was detected at a "Timestamp Generated" block 130. In alternative examples, the timestamp can be generated contemporaneously with, or prior to the determination of the coordinate grid address. The timestamp and the coordinate address are encoded together by the pulse detection digital logic block 80 and are then transmitted to a controller 90 at a "Pulse Address Encoded and Sent to Controller" block 140. In one example, the coordinate grid address and the timestamp are encoded as a single signal. In an alternative example, the coordinate grid address and the timestamp can be encoded as a paired group of two signals. In another alternative example, no encoding is done on the row and column voltages and a digital representation of these voltages is output from the image sensor in a raw digital form, along with the timestamp.

The controller 90 then identifies which pixels 20 detected a pulse using the coordinate grid address, and perform a pulse analysis on any pixels 20 that identified a pulse. This process does not require a full readout and analysis of every pixel 20 in the array 200. In this way, the amount of processing power and electrical power utilized by the controller 90 is reduced, relative to previous systems.

While described above in general terms and illustrated schematically, one of skill in the art having the benefit of this disclosure will understand that the pulse detection circuit 35 and the imaging circuit 32 can be any standard circuits capable of performing the described functions. Even further still, the illustrated controller 90 can be any digital controller including a microprocessor, custom logic in the image sensor integrated circuit, a generally purpose computer including a microprocessor, a Field Programmable Gate Array (FPGA), or any similar controller type.

Further, while described and illustrated above as a circuit configured to disconnect a row and column source from a digital logic block, one of skill in the art having the benefit of this disclosure will understand that a similar effect could be achieved using a system configured to connect a unique row and column voltage source to a digital logic block instead of disconnect a unique row and column voltage source from a digital logic block.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A pulse detecting imaging circuit comprising:
a pixel array including a plurality of pixels arranged in at least one row and at least one column;
a plurality of row voltages, each of said row voltages being connected to each pixel in a corresponding row;
a plurality of column voltages, each of said column voltages being connected to each pixel in a corresponding column;
each of said pixels including a pulse detection circuit;
an output of each pulse detection circuit connected to a corresponding row voltage and a corresponding column voltage such that each pixel is configured to assert a voltage change on the corresponding row voltage and the corresponding column voltage in response to a pulse detection at the pixel;
wherein each of said pixels includes a row transistor and a column transistor, a pulse detection circuit output being connected to a control node of each transistor such that while a pulse is detected each transistor is controlled on and while no pulse is detected each transistor is controlled off; and
wherein each of said transistors connects a corresponding voltage source to one of a known driven voltage and a ground when the transistor is controlled on.

2. The pulse detecting and imaging circuit of claim 1, wherein the output of said pulse detection circuit is connected to each of said transistors via a comparator, and said comparator is configured to output a positive output when a pulse is detected by said pulse detection circuit.

3. The pulse detecting and imaging circuit of claim 1, further comprising a digital logic block connected to each of said row voltages and each of said column voltages, and configured such that a pixel address is identifiable based on a received voltage from said row voltages and said column voltages.

4. The pulse detecting imaging circuit of claim 3, wherein said digital logic block further comprises a timestamp module configured to encode an output signal representative of a time at which a pulse was detected by at least one pixel.

5. The pulse detecting imaging circuit of claim 3, wherein said digital logic block includes an output, wherein a binary summary of each column and row voltage at a time a pulse is detected is encoded on said output.

6. The pulse detecting imaging circuit of claim 3, wherein said digital logic block includes an output, wherein summary of multiple pixel addresses at a time a pulse is detected is encoded on said output.

7. The pulse detecting imaging circuit of claim 3, further comprising a controller coupled to each of said pixels in said plurality of pixels, and wherein said controller is configured to receive an output of said digital logic block.

8. The pulse detecting imaging circuit of claim 7, wherein said controller is one of a microprocessor, logic on the image sensor integrated circuit, a Field Programmable Gate Array, and a general purpose computer including a microprocessor.

9. The pulse detecting imaging circuit of claim 1, wherein each of said pixels further includes an integrating imaging circuit.

10. A method for asynchronous pulse detection in a digital imaging circuit comprising:
detecting a pulse at least one pixel of a digital imaging pixel array;
switching a connection between at least one voltage source corresponding to the at least one pixel and a digital logic block;
determining a specific pixel address of said at least one pixel detecting the pulse based on an alteration of at least one received voltage at said digital logic block;
identifying the specific pixel based on an alteration of a received row voltage at said digital logic block and an alteration of a received column voltage at said digital logic block;
outputting the specific pixel address to a controller; and
wherein switching a connection between at least one voltage source corresponding to the at least one pixel and a digital logic block comprises switching a row transistor connecting a row voltage source to said logic block off and switching a column transistor connecting to a column voltage source to said logic block off.

11. The method of claim 10, further comprising generating a timestamp in response to a received voltage at said digital logic block lowering, and encoding a pulse detected signal with said timestamp.

12. The method of claim 10, further comprising identifying the specific pixel based on an alteration of a received row voltage at said digital logic block and an alteration of a received column voltage at said digital logic block.

* * * * *

UNITED STATES PATENT AND TRADEMARK OFFICE
CERTIFICATE OF CORRECTION

PATENT NO.        : 9,641,781 B2
APPLICATION NO.   : 14/672336
DATED             : May 2, 2017
INVENTOR(S)       : Minlong Lin and Joshua Lund It is certified that error appears in the above-identified patent and that said Letters Patent is hereby corrected as shown below:

In the Claims

In Claim 10, Column 6, Line 18; before "at least one pixel" insert --at--

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*